UNITED STATES PATENT OFFICE.

WILLIAM O. STODDARD, JR., OF MADISON, NEW JERSEY, ASSIGNOR, BY MESNE ASSIGN-
MENTS, TO THE DURATEX COMPANY, OF NEWARK, NEW JERSEY, A CORPORATION
OF NEW JERSEY.

MATERIAL ADAPTED FOR USE IN THE MANUFACTURE OF AN IMITATION LEATHER
AND METHOD OF MAKING THE SAME.

1,190,807.    Specification of Letters Patent.    Patented July 11, 1916.

No Drawing.    Application filed February 18, 1915. Serial No. 9,150.

*To all whom it may concern:*

Be it known that I, WILLIAM O. STODDARD, Jr., a citizen of the United States, residing at Madison, county of Morris, and State of New Jersey, have invented certain new and useful Improvements in Material Adapted for Use in the Manufacture of an Imitation Leather and Methods of Making the Same, of which the following is a specification.

In my application serial No. 879,451, filed December 29, 1914, I have described a fabric adapted for use in the manufacture of imitation leather, or as a substitute for leather. The general method described in said application consists in coating a suitable base, such as felt or a woven fabric with a composition which gives to the base a practically dry hard surface, and then applying to such surface a finishing coat which will unite or weld with said surface on the application of heat, the finished product having a surface which is practically impervious to air and water, and one which is adapted for use in the arts in the manufacture of an imitation leather, or as a substitute for leather.

The present method follows the same general steps as that described in my said application, with the addition of genuine leather fiber to the solutions used for the initial coat.

More specifically stated, the method of my said application consists in coating a fabric with a composition containing a nitro-cellulose solution, a vegetable oil, and leather fiber, then the application of a japanning composition containing a vegetable oil, a solvent, and a coloring matter, and finally subjecting the fabric so treated to a sufficient degree of heat to bake the japanning composition and to cause it to adhere firmly to the first coat. The two coats may be spread upon the fabric in any suitable manner, and the exact ingredients and their proportions may be varied to meet the requirements of the material which is adapted to known methods of embossing to produce an imitation leather. The following will serve as an example which has proved successful in practice.

The fabric, used as a base, may be such as has heretofore been used in the making of an imitation or leather substitute. For such base I have used both felt and a woven fabric. The first coat, as above stated, is a composition of a nitro-cellulose solution, a vegetable oil and leather fiber, and three applications of such composition are preferably made, the proportions of the ingredients varying as follows:—For the first application I take substantially 100 pounds of a twelve ounce solution of nitrated cotton to which is added about fifty-six pounds of a vegetable oil, preferably, rape seed oil, as with such oil I have secured better results than with any other. Castor oil, cotton seed oil and linseed oil may be used but the results are not as satisfactory as with rape seed oil. For the second application I use about 100 pounds of a twelve ounce solution of nitrated cotton and about twenty-eight pounds of the preferred vegetable oil. To this may be added about forty pounds of the solvent of the nitrated cotton. For the third application I use about 100 pounds of a twelve ounce solution of nitrated cotton and about nine pounds of the preferred vegetable oil. The nitrated cotton is dissolved in any well-known solvent, as amyl acetate or alcohol, and the vegetable oil added thereto. Each batch is thoroughly agitated to make a homogeneous composition, the first having a specific gravity of 17 Baumé at 60° Fahrenheit; the second a specific gravity of 25 Baumé at 60° Fahrenheit; and the third a specific gravity of 25 Baumé at 60° Fahrenheit. It will be noted that in the preferred proportions the amount of the vegetable oil in the first composition is such as will prevent it drying hard, and that the second composition contains substantially one-half of the amount of oil as the first, and that the third contains substantially one-sixth of the amount of oil as the first.

To the first, second or third, or to all of the above solutions I add leather fiber, such as tanned cowhide or steer hide. This fiber may be prepared in any suitable manner as by tearing or shredding the leather with an emery wheel, the fiber so prepared having the appearance of a light flocculent mass. For such production scrap leather may be advantageously used. The leather fiber is added to the base solutions in such quantity that when the composition is applied to the fabric the leather fiber will be spread over the surface of the fabric forming a practically continuous layer of leather in a very thin film or veneer.

The prepared compositions are applied or spread upon the fabric cold, by any suitable means such as by a brush, or from a nozzle in front of which is a knife or spreader, the full width of the fabric, and which spreads the composition in a thin even film over the fabric. The fabric may be mounted upon a frame having rollers around which the fabric is run in the form of a continuous belt, means being provided to cause the fabric to travel at any desired speed, varying from ten feet to sixty feet per minute.

Each film of the composition as it is applied, may be dried in the open air or by any known drying process, and after the desired number of applications, preferably three, of the nitro-cellulose, vegetable oil and leather composition have been made, the fabric is removed from the machine and hung up in ovens having a temperature of about 90° F. in order that it may properly season. At the end of this part of the operation the fabric will have a practically dry, hard coating firmly adhering thereto.

To the fabric, treated as above, is then applied a japanning composition comprising a vegetable oil, vegetable gums, a mineral solvent, and a coloring matter. For such composition I have used boiled linseed oil, naphtha and an opaque pigment. The fabric is placed on a long table and the japanning composition properly applied thereto as for example, with large brushes. After the japanning composition has been applied the fabric is run into a large chamber where it is subjected to a dry heat of about 150° F. in order to thoroughly bake, and to unite, the japanning coat with the coat of nitrated cotton. During the baking operation the heat softens the nitrated cotton coat and there is effected a firm union between the nitrated cotton and japanning coats.

The product produced as above described is substantially devoid of the odor of the solvents and oils used; it is soft and pliable, and if a woven fabric is used as the base, the lines of the weave are practically eliminated.

The product obtained by the foregoing treatment may be sold as a commercial article for any use for which it is adapted. The particular use to which I have put it is for making an imitation leather, and for such purpose the only further treatment required is to emboss it by means of a die in the usual and well-known manner, which completes the process for plain colors, and then for Spanish or antique effects to pass it through the so-called blacking process consisting in coating the material lightly with a composition of vegetable oils and vegetable gums, coloring matter and a suitable solvent. This final coating being allowed to partly dry when it is wiped off, care being used to remove only the blacking from the prominent or high points of the embossing. This finishing process brings out the variegated or so-called Spanish and antique effects.

The union between the nitro-cellulose coat and the japanning coat is sufficiently firm to prevent separation between them when subjected to the die press for the purpose of embossing. This characteristic is one of extreme importance as it makes it possible to emboss a japanned surface on fabrics which, so far as known to me, has been impossible heretofore. Furthermore, the product, after embossing and blacking, is very pliable and may be bent without cracking and is well adapted for upholstery work.

The addition of leather as an ingredient of one or more of the initial coating solutions has many practical advantages. It gives a leather-wearing surface and a body to the fabric which better adapts it for taking the embossing. Furthermore it gives a leather feel and answers the demand for a substitute containing genuine leather.

In the specification and claims I have used the term "fabric" to mean generically, felt or a woven fabric, or such material as has heretofore been used in the making of an imitation or leather substitute.

Believing myself to be the first to coat a fabric with a composition containing nitrated cotton, an oil and genuine leather, and a superimposed coat united thereto, I desire to claim the same broadly without reference to the particular ingredients of the composition.

What I claim and desire to secure by Letters Patent of the United States is:—

1. A fabric coated with a composition containing nitro-cellulose and leather.

2. A fabric coated with a composition containing nitro-cellulose and leather, and a superimposed coating of a japanning composition.

3. A fabric coated with a composition containing nitro-cellulose and leather, and a superimposed baked coating of a japanning composition.

4. A fabric coated with a composition containing nitro-cellulose and leather, and a superimposed coating of a japanning composition united to the first-named coat.

5. A fabric coated with a composition containing nitrated cotton, an oil and leather.

6. A fabric coated with a composition containing nitrated cotton, an oil and leather, and a superimposed coating of a japanning composition.

7. A fabric coated with a composition containing nitro-cellulose, a vegetable oil and leather.

8. A fabric coated with a composition containing nitro-cellulose, a vegetable oil and leather, and a superimposed coating of a japanning composition.

9. A fabric coated with a composition containing nitrated cotton, rape seed oil and leather.

10. A fabric coated with a composition containing nitrated cotton, rape seed oil and leather, and a superimposed coating of a japanning composition.

11. The process which consists in applying to a fabric a composition containing nitrated cotton, an oil and leather, then a japanning composition, and then subjecting the fabric so coated to a baking heat.

12. The process which consists in applying to a fabric a composition containing nitrated cotton, rape seed oil and leather, then a japanning composition, and then subjecting the fabric so coated to a baking heat.

13. The process which consists in applying to a fabric a nitro-cellulose composition containing leather, and then applying a sealing composition and uniting the same with the first coat.

14. The process which consists in applying to a fabric a nitro-cellulose composition containing a vegetable oil and leather, drying the fabric, and then applying a sealing composition and uniting the same with the first coat.

15. The process which consists in coating a fabric with a composition containing nitrated cotton, an oil and leather, then a coating containing a vegetable oil and a coloring matter, and then heating the fabric so coated.

16. The process which consists in coating a fabric with a composition containing nitrated cotton and leather, then a coating containing an oil and a coloring matter, then heating the fabric so coated, and then embossing the surface of the fabric.

In testimony whereof I have hereunto signed my name in the presence of the subscribing witnesses.

WILLIAM O. STODDARD, Jr.

Witnesses:
  M. E. McNinch,
  Charles A. Jones.